United States Patent [19]

Boudot et al.

[11] Patent Number: 4,469,800
[45] Date of Patent: Sep. 4, 1984

[54] MOLDABLE FLUOROBORATE OPTICAL GLASSES

[75] Inventors: Jean E. Boudot; Jean P. Mazeau, both of Avon, France

[73] Assignee: Corning Glass Works, Corning, N.Y.

[21] Appl. No.: 518,045

[22] Filed: Jul. 28, 1983

[30] Foreign Application Priority Data

Sep. 02, 1983 [FR] France .................. 83 02037

[51] Int. Cl.³ ............... C03C 3/00; C03C 3/30
[52] U.S. Cl. .................... 501/43; 501/50; 501/51; 501/75; 501/76; 501/78; 501/903
[58] Field of Search .......... 501/43, 50, 51, 75, 501/76, 78, 903

[56] References Cited

U.S. PATENT DOCUMENTS 2,764,492 9/1956 Weissenberg et al. .............. 501/43
4,118,238 10/1978 Ishibashi et al. .................... 501/43
4,128,432 12/1978 Komorita et al. .................... 501/51

FOREIGN PATENT DOCUMENTS 3130715 2/1982 Fed. Rep. of Germany ...... 501/903
2024804 1/1980 United Kingdom ................ 501/903

Primary Examiner—Mark Bell
Attorney, Agent, or Firm—C. S. Janes, Jr.

[57] ABSTRACT

This invention is concerned with the preparation of moldable optical glasses having refractive indices of about 1.65–1.735, dispersions of about 38–58, transition temperatures lower than about 500° C., softening points lower than about 600° C., and satisfactory chemical durability consisting essentially, expressed in terms of parts by weight as calculated from the batch, of

|  |  |
|---|---|
| $B_2O_3$ | 22–38 |
| BaO | 3–33 |
| $La_2O_3$ | 5–33 |
| PbO | 0–36 |
| ZnO | 0–14 |
| CdO | 0–12 |
| SrO | 0–10 |
| BaO + $La_2O_3$ + PbO + ZnO + CdO + SrO | 55–68 |
| $Li_2O$ | 0–4 |
| $Na_2O$ | 0–4 |
| $Li_2O$ + $Na_2O$ | 1.5–4 |
| F | 1–8. |

2 Claims, No Drawings

MOLDABLE FLUOROBORATE OPTICAL GLASSES

BACKGROUND OF THE INVENTION

U.S. application Ser. No. 316,861, filed Oct. 30, 1981 in the names of Jean-Pierre Marechal and Richard O. Maschmeyer and entitled Process to Mold Precision Glass Articles, discloses a molding procedure for obtaining a given finished optical element (a lens, for example) by reshaping a glass body in contact with a mold, the glass being at a viscosity between about $10^8$–$10^{12}$ poises. The capability of molding glass bodies to very precise tolerances is of great economic advantage in that costly grinding and polishing are eliminated. This is especially true where the configuration of the desired product is not regular, for example, an aspheric lens. As is explained, it is most advantageous to employ glass compositions having molding temperatures as low as possible to prevent rapid deterioration of molds.

It will be highly desirable to develop glass compositions suitable for precision molding optical glasses exhibiting high refractive indices ($n_D = 1.65$–$1.735$), reduced dispersions ($V_D = 38$–$58$), low transition temperatures ($T_g < 500°$ C.), low softening points ($T_L < 600°$ C.), and satisfactory chemical durabilities.

Classic optical glasses demonstrating similar optical properties employed heretofore have generally exhibited transition temperatures ($T_g$) and softening temperatures ($T_L$) higher than 600° C. and 700° C., respectively. As conventionally classified, those glasses belong to families termed "Special Barium Flints" and "Special Barium Crowns". The basic components of those glasses are $SiO_2$, $B_2O_3$, BaO, and $La_2O_3$.

OBJECTIVE OF THE INVENTION

The primary objective of the present invention is to develop glass compositions suitable for the precision molding of optical elements which are characterized by refractive indices of about 1.65–1.735, coefficients of dispersion of about 38–58, transition temperatures below 500° C., softening points below 600° C., and satisfactory chemical durabilities.

SUMMARY OF THE INVENTION

Glasses manifesting those properties can be prepared from compositions consisting essentially, expressed in terms of weight percent on the oxide basis, of

| | |
|---|---|
| $B_2O_3$ | 22–38 |
| BaO | 3–33 |
| $La_2O_3$ | 5–33 |
| PbO | 0–36 |
| ZnO | 0–14 |
| CdO | 0–12 |
| SrO | 0–10 |
| BaO + $La_2O_3$ + PbO + ZnO + CdO + SrO | 55–68 |
| $Li_2O$ | 0–4 |
| $Na_2O$ | 0–4 |
| $Li_2O$ + $Na_2O$ | 1.5–4 |
| F | 1–8 |
| $SiO_2$ and/or $K_2O$ and/or MgO and/or CaO and/or $WO_3$ and/or $Gd_2O_3$ and/or $Y_2O_3$ and/or $ZrO_2$ and/or $Nb_2O_5$ and/or $TiO_2$ | 0–5 |

The glasses having the most preferred combination of properties, i.e., a refractive index of about 1.665–1.71, a dispersion of about 46–56, a softening point of about 535°–590° C., a good resistance to attack by atmospheric agents (termed resistance to "weathering"), and good stability with respect to devitrification, consist essentially, expressed in terms of weight percent on the oxide basis, of

| | |
|---|---|
| $B_2O_3$ | 24–35 |
| BaO | 8–25 |
| $La_2O_3$ | 17–32 |
| PbO | 0–20 |
| ZnO | 0–10 |
| CdO | 0–10 |
| SrO | 0–8 |
| BaO + $La_2O_3$ + PbO + ZnO + CdO + SrO | 58–67 |
| $Li_2O$ | 1–3 |
| $Na_2O$ | 0–2.5 |
| $Li_2O$ + $Na_2O$ | 1.5–3.5 |
| F | 2.5–6.5 |

Up to 5% total of one or more of $SiO_2$, CaO, MgO, $TiO_2$, and $Y_2O_3$ may optionally be included. The amounts of CaO, MgO, $TiO_2$, and $Y_2O_3$ will be included in the sum of BaO + $La_2O_3$ + PbO + ZnO + CdO + SrO.

A better understanding of the specific limits for the principal components of the glass compositions will be derived from the following description.

$B_2O_3$ is the principal glass forming oxide. A minimum content of 22% is necessary to obtain a glass; however, above about 38% the tendency for devitrification is raised, the chemical resistance (Resistance to weathering) is diminished, and the refractive index reduced (the optical properties resemble those of known moldable glasses of the past).

The oxides BaO, $La_2O_3$, PbO, ZnO, CdO, and SrO essentially determine the optical properties. The sum thereof must comprise between 55–68% in order to obtain the range of properties required (high refractive index and low dispersion). The effects of each oxide on the refractive index and the Abbe number are basically known; one can simply note that the combination $B_2O_3$—BaO—$La_2O_3$ permits high indices and a low dispersion to be obtained. The particular effects of each oxide on the system studied can be summarized as follows: at less than 3% BaO, the tendency of the glass to devitrify is raised, and at above 33% the resistance to weathering is decreased. $La_2O_3$ is extremely beneficial with respect to chemical durability; therefore the glass should contain at least 5%. It rapidly increases the softening temperature and above 33% the glass becomes completely devitrified. PbO permits the softening point to be reduced; however, at about 33% the resistance to weathering decreases, the Abbe number is reduced, and pronounced tinting of the glass occurs. The glass can contain ZnO which can be utilized effectively to limit the amount of BaO and $La_2O_3$; however, above 14% the chemical durability diminishes. At a first approximation CdO plays the same role, but raises the softening point more rapidly. SrO behaves identically to BaO but the latter is preferred since it raises the softening point less rapidly.

The alkali metal oxides (a minimum $Na_2O + Li_2O$ of 1.5%) are indispensable to obtain a softening point within the previously mentioned range. Above 4% the glass opalizes and the resistance to weathering is very low. $Li_2O$ is preferred to $Na_2O$ because it contributes a greater diminution in the softening point and a loss reduction in refractive index.

Fluorine is also an essential component. Indeed, fluorine has been found to produce a stabilizing effect on this type of glass. If fluorine is completely eliminated, the liquidus temperature becomes high and, in particular, glasses of high $La_2O_3$ content cannot be obtained without devitrification, even when poured at very high temperatures. Therefore, a minimum of 1% by weight fluorine must be introduced into the vitrifiable batch. It has also been determined that an initial fluorine content of about 5% represents approximately an optimum insofar as stability with respect to devitrification may be concerned. Above 8% the glass exhibits a strong tendency for opalization/crystallization and chemical durability is degraded. As previously known, fluorine substantially lowers the softening point, reduces the refractive index, and decreases the dispersion of the glass.

PRIOR ART

U.S. Pat. No. 2,764,492 describes optical glasses containing $B_2O_3$ and F as basic ingredients. The compositions for the glasses are generally worded as comprising three classes of components:

(1) $B_2O_3$;

(2) at least one member of the group $LiF$, $MgF_2$, $CaF_2$, $SrF_2$, $BaF_2$, $ZnF_2$, $CdF_2$, and $HgF$; and (3) at least one member of the group $Li_2O$, $MgO$, $CaO$, $SrO$, $BaO$, $ZnO$, $CdO$, and $Hg_2O$. The mole ratio $B_2O_3$:fluorides ranges between 10:1-1:1, and the sum $B_2O_3$+fluorides ranges between 8.3-91% by weight.

No supporting data are presented to undergird such a broad disclosure. On the contrary, the preferred glasses contained 50.3-54.0% by weight $La_2O_3$ or 61.2-86% by weight PbO. No working example is disclosed coming within the ranges of the present inventive glasses.

DESCRIPTION OF PREFERRED EMBODIMENTS

The invention is illustrated by the examples appearing in Table I. The compositions are given in terms of batch contents and are calculated in such a manner that a quantity approximately equal to 100% is represented by the sum of the oxides in weight percent plus the weight percentage of fluorine minus the oxygen equivalent to fluorine, i.e., 0.421×the weight percentages of fluorine.

Besides the optical properties, refractive index and Abbe number for the "d" line of helium, the softening point and the resistance to atmospheric agents (weathering) have been determined. The softening point of the glass (S.P. in °C.) and the resistance to weathering (W) have been obtained through the following methods and are also recorded in Table I.

The softening point of a glass can be estimated with the aid of a method developed in the laboratory which gives a temperature of 10°-25° C. in excess with respect to the conventional point of Littleton. The method consists of sagging a disc of glass having a diameter of 32 mm and a thickness of 4 mm in a kiln where the rate of heating is 60° C./hour. The sample holder having been made the object of a standard, the approximate softening temperature is read when the glass comes to obstruct a leak of air placed under the part. This method is sufficient to permit a good selection of the so-called "moldable" glasses and it offers the advantage of being able to determine the approximate softening point of glasses for which the conventional method is not adequate (crystallization of the glass occurs during drawing of fibers).

The resistance to weathering is evaluated through the following test: polished discs having a diameter of about 32 mm and a thickness of about 6 mm are placed in a humid atmosphere (98% relative humidity) maintained at 50° C., and the samples are observed periodically (intervals of 1-3 days) for about 30 days. The samples are classed A, B, C, D, or E depending upon the level of attack observed with the unaided eye under intense illumination. The classes are defined as: A=no attack observed; B=some points of attack or slight diffusion of light visible only under illumination; C=many points of attack or considerable diffusion of light visible under illumination; D=many points of attack or considerable diffusion of light visible under normal ambient light; and E=very considerable attack.

The glasses of the invention are obtained from a glass forming batch prepared in the classical manner. The batch contains substances chosen, for example, from boric anhydride, carbonates of lithium, sodium, barium, and cadmium, fluorides of lanthanum, sodium, barium, and lead, and oxides of zinc, lanthanum, and lead.

A batch representing about 50-4000 grams of glass is placed into a platinum crucible and the batch melted in the range of temperatures of 1000°-1200° C. for periods of 30 minutes to 2 hours. The glasses are homogenized through the aid of a platinum stirrer. After a fining operation, the glass is brought to a temperature (about 850° C.) corresponding to a viscosity between about 1-20 poises in order to proceed with shaping of bars or plates having a thickness of 10-20 mm. The glass so formed is thereafter annealed one hour at 480°-500° C. and then cooled slowly (about 60° C./hour) to ambient temperature.

A complete analysis was performed on Example 1 which represents one of the preferred glasses. Table II gives this analysis in comparison with the batch contents. It can be observed that the fluorine content retained in the borate glasses is particularly high ($F_{analyzed}$:$F_{theoretical}$=86%). It has also been established that the reproducibility of the properties, for the same batch composition, is very good; it is probable that this circumstance is tied to the high retention of fluorine in this type of glass.

Table III gives other important characteristics of glass represented by Example 1. This example constitutes one of the preferred glasses because it exhibits a high index, a low dispersion, and good resistance to weathering, and softening and annealing points sufficiently low to permit molding at temperatures between 460°-500° C.

The glasses of the invention may receive an antireflecting treatment; for example, a deposit of magnesium fluoride through vacuum evaporation which also improves the resistance to atmospheric agents.

TABLE I

|  | 1 | 2 | 3 | 4 | 5 | 6 | 7 |
|---|---|---|---|---|---|---|---|
| $B_2O_3$ | 29.21 | 24.56 | 35.25 | 35.59 | 29.7 | 34.56 | 30.05 |
| $Li_2O$ | 2.09 | 0.96 | 2.09 | — | 1.06 | 3.46 | 2.15 |
| $Na_2O$ | — | 1.99 | — | 2.26 | 2.2 | — | — |
| BaO | 17.15 | 17.7 | 21.5 | 20.15 | 19.63 | 22.83 | 8.82 |
| ZnO | 5.69 | 5.22 | 6.34 | — | — | 6.73 | 5.85 |
| $La_2O_3$ | 27.34 | 31.35 | 17.76 | 16.66 | 27.8 | 18.87 | 28.12 |

TABLE I-continued

|       | 1     | 2     | 3     | 4     | 5     | 6     | 7     |
|-------|-------|-------|-------|-------|-------|-------|-------|
| CdO   | —     | —     | —     | 9.38  | —     | 10.62 | 9.24  |
| PbO   | 15.61 | 11.45 | 13.91 | 13.04 | 12.7  | —     | 12.84 |
| SiO$_2$ | —   | 3.85  | —     | —     | —     | —     | —     |
| CaO   | —     | —     | —     | —     | 3.99  | —     | —     |
| F     | 5.05  | 5.05  | 5.05  | 5.05  | 5.05  | 5.05  | 5.05  |
| n$_D$ | 1.6996 | 1.6880 | 1.6621 | 1.6638 | 1.6805 | 1.6536 | 1.7048 |
| V$_D$ | 47.4  | 48.0  | 51.8  | 50.4  | 48.8  | 57.6  | 47.6  |
| S.P.  | 555   | 560   | 550   | 582   | 560   | 540   | 555   |
| W     |       |       |       |       |       |       |       |
| 1 day | A-B   | —     | D     | A-B   | —     | D     | C-D   |
| 2 days | C-D  | —     | D-E   | C     | —     | D-E   | D     |
| 6 days | D    | —     | D-E   | —     | —     | D-E   | D     |

|       | 8     | 9     | 10    | 11    | 12    | 13    | 14    |
|-------|-------|-------|-------|-------|-------|-------|-------|
| B$_2$O$_3$ | 30.83 | 29.71 | 28.53 | 31.78 | 31.36 | 32.39 | 31.0  |
| Li$_2$O | 2.21 | 2.13 | 2.04 | 1.14 | 2.24 | 2.32 | 2.22 |
| Na$_2$O | — | — | — | 2.36 | — | — | — |
| SrO   | 7.65  | —     | —     | —     | —     | —     | —     |
| BaO   | 20.37 | 30.53 | 18.85 | 21.0  | 20.72 | 21.4  | 20.48 |
| ZnO   | 6.01  | 5.79  | —     | 6.19  | 12.22 | 6.31  | 4.83  |
| La$_2$O$_3$ | 16.83 | 16.22 | 26.7 | 29.75 | 17.12 | 17.69 | 29.02 |
| CdO   | —     | —     | 8.77  | —     | —     | —     | 9.53  |
| PbO   | 13.18 | 12.7  | 12.19 | —     | 13.41 | 13.85 | —     |
| TiO$_2$ | — | — | — | 4.86 | — | — | — |
| MgO   | —     | —     | —     | —     | —     | 3.13  | —     |
| F     | 5.05  | 5.05  | 5.05  | 5.05  | 5.05  | 5.05  | 5.05  |
| n$_D$ | 1.6704 | 1.6733 | 1.6946 | 1.6850 | 1.6765 | 1.6691 | 1.6784 |
| V$_D$ | 50.3  | 50.1  | 47.7  | 48.7  | 49.5  | 49.6  | 55.5  |
| S.P.  | 540   | 535   | 578   | 590   | 540   | 540   | 572   |
| W     |       |       |       |       |       |       |       |
| 1 day | D     | D     | A-B   | A-B   | D     | C     | A-B   |
| 2 days | D-E  | D-E   | C-D   | C     | D-E   | D     | C     |
| 6 days | D-E  | D-E   | D-E   | D-E   | D-E   | D     | C-D   |

|       | 15    | 16    | 17    | 18    | 19    | 20    | 21    |
|-------|-------|-------|-------|-------|-------|-------|-------|
| B$_2$O$_3$ | 30.26 | 28.26 | 30.72 | 28.8 | 28.26 | 30.05 | 28.26 |
| Li$_2$O | 2.16 | 2.02 | 2.2 | 2.06 | 2.02 | 2.15 | 2.02 |
| BaO   | 20.0  | 18.68 | 20.3  | 24.31 | 14.68 | 3.82  | 10.68 |
| ZnO   | 5.9   | 5.51  | 5.98  | 5.61  | 5.51  | 5.85  | 5.51  |
| La$_2$O$_3$ | 16.52 | 15.43 | 16.77 | 15.72 | 15.43 | 28.12 | 15.43 |
| CdO   | 9.3   | —     | 9.44  | —     | —     | 9.24  | —     |
| PbO   | 12.94 | 27.18 | 13.13 | 20    | 31.18 | 17.54 | 35.18 |
| F     | 5.05  | 5.05  | 2.53  | 6.05  | 5.05  | 5.05  | 5.05  |
| n$_D$ | 1.6868 | 1.7037 | 1.7040 | 1.6888 | 1.7186 | 1.7193 | 1.7301 |
| V$_D$ | 47.7  | 42.8  | 45.9  | 45.4  | 40.4  | 45.4  | 38.3  |
| S.P.  | 532   | 510   | 540   | 522   | —     | —     | —     |
| W     |       |       |       |       |       |       |       |
| 1 day | D     | D     | C-D   | D     | —     | —     | —     |
| 2 days | D-E  | D     | D     | D-E   | —     | —     | —     |
| 6 days | D-E  | D-E   | D-E   | D-E   | —     | —     | —     |

TABLE II

Example 1 - Total Analysis of the Glass

|       | Batch Composition | Analyzed Composition |
|-------|-------------------|----------------------|
| B$_2$O$_3$ | 29.21        | 28.85                |
| Li$_2$O   | 2.09         | 2.10                 |
| BaO   | 17.15             | 16.90                |
| ZnO   | 5.69              | 5.80                 |
| La$_2$O$_3$ | 27.34       | 27.56                |
| PbO   | 15.61             | 15.75                |
| F     | 5.05              | 4.32                 |

B, Ba, and La were analyzed by plasma atomic emission, Li and Zn by atomic absorption, Pb by electrogravimetry, and F by pyrohydrolysis and colorimetry.

TABLE III

Example 1 - Other Properties

| Strain Point* | = 440° C. |
|---|---|
| Annealing Point* | = 460° C. |
| Softening Point* | = 560° C. |
| Coefficient of Expansion (25°–300° C.) | = 91.5 × 10$^{-7}$/°C. |
| Density | = 4.35 grams/cm$^3$ |
| Transmission at 400 nm | = 74% |

TABLE III-continued

Example 1 - Other Properties (10 mm thickness)

*Properties determined by the method termed "beam-bending viscosimeter" described by H. E. Hagy in "Experimental Evaluation of Beam-Bending Method of Determining Glass Viscosities in the Range 10$^8$ to 10$^{15}$ Poises", Journal of the American Ceramic Society, 46, No. 2, 1963, pp. 93–97.

We claim:

1. A moldable optical glass of the fluoroborate type having an index of refraction of about 1.665–1.71, a coefficient of dispersion of about 46–56, a softening point of about 535°–590° C., a transition temperature below 500° C., good resistance to attack by atmospheric agents, and good stability with respect to devitrification, consisting essentially of the following contents in weight percent on the oxide basis as calculated from the batch:

| B$_2$O$_3$ | 24–35 |
|---|---|
| BaO | 8–25 |
| La$_2$O$_3$ | 17–32 |
| PbO | 0–20 |
| ZnO | 0–10 |

-continued

| | | |
|---|---|---|
| CdO | 0–10 | |
| SrO | 0–8 | |
| BaO + La$_2$O$_3$ + PbO + ZnO + CdO + SrO | 58–67 | |
| Li$_2$O | 1–3 | |
| Na$_2$O | 0–2.5 | |
| Li$_2$O + Na$_2$O | 1.5–3.5 | |

-continued

| | |
|---|---|
| F | 2.5–6.5 |

2. A moldable optical glass according to claim 1 also containing up to 5% total of at least one oxide selected from the group of SiO$_2$, CaO, MgO, TiO$_2$, and Y$_2$O$_3$, the proportion of any CaO, MgO, TiO$_2$, or Y$_2$O$_3$ being included in the total of BaO+La$_2$O$_3$+PbO+ZnO+CdO+SrO.

* * * * *